United States Patent Office 3,406,214
Patented Oct. 15, 1968

3,406,214
METHOD OF PREPARING PERFLUOROETHYL IODIDE
Walter Blochl, Karlsruhe, Germany, assignor to FMC Corporation, New York, N.Y., a corporation of Delaware
No Drawing. Continuation-in-part of application Ser. No. 475,282, July 27, 1965. This application Aug. 19, 1966, Ser. No. 573,456
5 Claims. (Cl. 260—653)

ABSTRACT OF THE DISCLOSURE

Perfluoroethyl iodide is prepared by introducing perfluoroethylene into iodine pentafluoride containing a minor amount of dissolved iodine and isolating the so formed perfluoroethyl iodide.

---

This is a continuation-in-part of my copending application Ser. No. 475,282, filed July 27, 1965, now abandoned.

This invention relates to perfluoroethyl iodide and in particular to a method of preparing it by reacting perfluoroethylene with iodine pentafluoride in the presence of elemental iodine.

Perfluoroethyl iodide is a known compound which is much used in the manufacture of organic fluorochemicals. It is, for example, a key starting material in the so-called telomerization reaction. The latter is a type of polymerization whereby perfluoroalkyl iodides of varying carbon chain links can be built up by the successive reaction of a perfluoroolefin such as perfluoroethylene with perfluoroethyl iodide. The resulting perfluoroalkyl iodides constitute a class of chemical intermediates which, because of the reactivity of the iodine atom, are readily transformed into many useful and valuable fluorine-containing compounds.

In view of its role as a key fluorochemical intermediate, perfluoroethyl iodide has been investigated extensively, particularly as regards its preparation, and numerous types of synthetic procedures have been proposed. However, none of these are entirely satisfactory, at least so far as commercial products are concerned. A method which has received a great deal of attention and study is the reaction of perfluoroethylene with a combination of iodine and iodine pentafluoride. Presumably, the iodine and iodine pentafluoride combine with one another to form iodine monofluoride of the formula IF and this in turn adds to the double bond in the tetrafluoroethylene. The process is commonly carried out by heating perfluoroethylene and a mixture of at least two moles of elemental iodine and one mole of iodine pentafluoride under pressure in the presence of certain metals and/or metal iodides as a catalyst. Such a process is disclosed in U.S. Patent 3,006,973 to Hauptschein et al. An improvement or at least variation of Hauptschein's procedure utilizes a different type of catalyst system, preferably antimony trifluoride. The latter process is the subject matter of U.S. Patent 3,132,185 to Parsons. Whereas the method of Hauptschein et al. requires inhibitors to prevent runaway polymerization with the more reactive species, e.g. perfluoroethylene, the catalyst of Parsons on the other hand obviates the need for inhibitors. However, both processes are objectionable in that high pressures are required. Perfluoroethylene is a hazardous material to handle even under normal conditions. It is extremely sensitive and dangerous under autogenous pressure.

I have now discovered a method of reacting perfluoroethylene with iodine and iodine pentafluoride to give perfluoroethyl iodide without the attendant disadvantages of the prior known processes and the provision of such a method constitutes the principal object and purpose of the invention. Other objects and purposes will become manifest subsequently.

The present invention is predicated on the rather unexpected finding that perfluoroethyl iodide is readily and easily formed by contacting gaseous tetrafluoroethylene with liquid iodine pentafluoride at no more than about atmospheric pressure in the presence of a minor amount of elemental iodine relative to the iodine pentafluoride and recovering the so-formed perfluoroethyl iodide from the reaction product. Generally speaking excellent results are realized by bubbling or introducing gaseous tetrafluoroethylene through a liquid mixture of iodine pentafluoride and a minor amount of elemental iodine relative to the iodine pentafluoride at atmospheric pressure and at mildly elevated temperatures, preferably about 40° C. to 80° C.

The reaction of tetrafluoroethylene with the liquid mixture of iodine and iodine pentafluoride to produce perfluoroethyl iodide in accordance with my new process proceeds at a practical rate even after relatively short contact periods. I have for instance achieved appreciable conversion of the perfluoroethylene to perfluoroethyl iodide after a contact time of only one minute or so. Of course, longer times result in proportionally higher conversions. An unusual aspect of the process herein is that it proceeds without significant quantities of by-products being formed. In fact, the unconverted perfluoroethylene and perfluoroethyl iodide end product can be reintroduced through the liquid mixture of iodine/iodine pentafluoride until most of the perfluoroethylene has been transformed into perfluoroethyl iodide without fear of ancillary reactions occurring. In many of the known processes it is difficult to prevent telomerization from taking place, i.e., addition of the perfluoroethyl iodide to the perfluoroethylene with concomitant build up of telogens of higher molecular weight. My process is thus not critical in that it requires sensitive and delicate control to obviate formation of undesirable by-products. The reaction conditions which I have discovered are thus unusually conducive to essentially the sole formation of perfluoroethyl iodide.

Moreover, the method of the invention requires no catalyst or inhibitors and this constitutes a further improvement and advantage over the hitherto practiced processes using iodine/iodine pentafluoride and perfluoroethylene.

The amount of elemental iodine added to the iodine pentafluoride should not alter or materially change the liquid character of the iodine pentafluoride which melts at 9.6° C. and boils at 98° C. In this connection I have determined that the upper limit of elemental iodine is about 50% of the weight of the iodine pentafluoride while the lower limit although not critical is for practical purposes in the neighborhood of about 1%. The preferred amount is about 10%. Where the amount of iodine is increased above 10% it sublimes out of the iodine/iodine pentafluoride mixture thereby causing clogging of equipment and generally interfering with the smooth operation of the process.

The reaction of the perfluoroethylene with the iodine/iodine pentafluoride mixture is moderately exothermic. It can be regulated and the preferred temperature range realized by adjusting the flow rate of the perfluoroethylene. In some instances admitting the perfluoroethylene in increments serve to conveniently maintain the optimum temperature. Supplemental heat control is also useful and convenient in regulating the temperature. Thus, where the perfluoroethylene passes through the iodine/iodine pentafluoride mixture at a high flow rate, external cooling may be needed. On the other hand very low flow rates will not normally necessitate external heating of the reaction to provide optimum conditions.

According to the teachings of the prior art a high ratio of iodine to iodine pentafluoride is required to realize successful addition of iodine fluoride (IF) to the perfluoroethylene double bond. Thus, both the Hauptschein et al. and Parsons patents specify a preference of at least two moles of iodine to one mole of iodine pentafluoride. Such a ratio amounts to 230% of the weight of the iodine pentafluoride or 23 times the 10% ratio used herein. In fact according to the Hauptschein et al. patent iodine pentafluoride containing small amounts of elemental iodine functions essentially as a fluorinating agent and does not give the desired perfluoroethyl iodide. By thus reversing the ratio of iodine to iodine pentafluoride and at the same time operating under mild temperatures without a catalyst or inhibitor and generally operating in a manner counter to the prior art, I have achieved excellent yields and conversion of perfluoroethylene to perfluoroethyl iodide without significant formation of by-products. At the same time I have eliminated the hazard of working with perfluoroethylene at super-atmospheric pressures.

Iodine pentafluoride is a known chemical compound which is described in the usual chemical texts and periodicals. It is commonly prepared by reacting iodine and fluorine in the gaseous phase at a temperature of about 150° C. It is a colorless liquid.

As previously explained, my process of producing perfluoroethyl iodide is not critical in that the perfluoroethylene is merely passed through the liquid mixture of iodine and iodine pentafluoride. That is to say reaction times do not have to be delicately adjusted to achieve a product free of ancillary materials. It is, in other words, self-regulating. Short contact times give low conversions and high yields whereas longer contact times result in high conversions and high yields.

In practicing the process of the invention the gaseous perfluoroethylene and liquid iodine/iodine pentafluoride mixture can be brought into contact with one another using known procedures. Perhaps the simplest manner of conducting the process is to bubble the perfluoroethylene through a vessel of the iodine/iodine pentafluoride and isolating the so-formed perfluoroethyl iodine from the exiting gases which consist of unreacted perfluoroethylene, iodine vapor, iodine pentafluoride vapor and the perfluoroethyl iodine product. Another method of operation consists in admitting perfluoroethylene to a circulating or moving stream of the iodine/iodine pentafluoride. Elemental iodine and iodine pentafluoride are replenished as they are consumed. In fact my process is readily adaptable to the automatic production of perfluoroethyl iodide. In such a system the iodine/iodine pentafluoride is pumped through a column or tube preferably a packed column to increase surface area while perfluoroethylene is introduced countercurrently. The resulting mixture of perfluoroethyl iodide, unreacted perfluoroethylene, iodine vapor and iodine pentafluoride vapor are conducted to a cooling station where the iodine/iodine pentafluoride vapors are condensed and returned to the system while the perfluoroethyl iodide and unreacted perfluoroethylene are separated by fractional distillation or lead to a telomerization station for conversion into higher molecular weight, telogens. Since the iodine imparts to the normally colorless iodine pentafluoride, a pink to brownish tint, electronic color sensing devices can be utilized to monitor and control the iodine content of the iodine/iodine pentafluoride mixture in order to maintain the optimum ratio of components. Those skilled in the art will in general appreciate that the process can be performed using various modifications and ramifications disclosed herein without departing from the scope and spirit of the invention.

Example 1

A 100 ml., two-necked, pear-shaped flask was filled to ⅓ of its height with iodine pentafluoride having dissolved therein about 10% iodine based on the weight of the iodine pentafluoride. 15.0 g. of pure, distilled tetrafluoroethylene was introduced through the side arm of the flask at a rate of about 100 mls. per minute while maintaining the temperature of the iodine/iodine pentafluoride between about 60° C. and about 80° C. The gas was admitted through an inlet tube extending to the bottom of the flask. The gases emerging from the flask were collected in a cold trap maintained at −180° C. After all of the tetrafluoroethylene has been bubbled through the iodine/iodine pentafluoride liquid the frozen mass in the cold trap was collected and subjected to fractional distillation. There was obtained a low boiling fluorocarbon fraction and a residue of iodine pentafluoride. The low boiling fluorocarbon fraction amounted to 23.5 g. and contained 38% by weight unconverted tetrafluoroethylene and 61% by weight perfluoroiodoethane. The conversion amounted to about 40% and the yield about 90%.

Example 2

The procedure of Example 1 was repeated but in this preparation the iodine was not dissolved in the iodine pentafluoride but introduced in the form of a vapor along with the tetrafluoroethylene gas. The results and yields paralleled those obtained in the case of Example 1.

What is claimed is:

1. A method of preparing perfluoroethyl iodide which comprises contacting gaseous perfluoroethylene with liquid iodine pentafluoride in the presence of dissolved elemental iodine in a minor amount relative to the iodine pentafluoride at about atmospheric pressure and at a temperature at which iodine pentafluoride remains liquid for a sufficient period of time whereby at least part of the tetrafluoroethylene is converted to perfluoroethyl iodide and recovering the so formed perfluoroethyl iodide from the reaction product.

2. The method according to claim 1 wherein the gaseous tetrafluoroethylene is bubbled through the iodine pentafluoride.

3. The method according to claim 1 wherein the pressure is atmospheric pressure.

4. The method according to claim 1 wherein the temperature is from about room temperature to below 100° C.

5. A method of preparing perfluoroethyl iodide which comprises conducting gaseous perfluoroethylene through a liquid mixture of iodine pentafluoride containing a minor amount of dissolved elemental iodine relative to the iodine pentafluoride at atmospheric pressure and at a temperature of from about 40° C. to about 80° C. for a sufficient period of time whereby at least part of the tetrafluoroethylene is converted to perfluoroethyl iodide and recovering the so formed perfluoroethyl iodide from the reaction product.

References Cited

UNITED STATES PATENTS 3,006,973   10/1961   Hauptschein et al.
3,132,185   5/1964    Parsons.

DANIEL D. HORWITZ, *Primary Examiner.*